United States Patent
Zhang et al.

(10) Patent No.: US 11,570,161 B2
(45) Date of Patent: Jan. 31, 2023

(54) DEVICES AND METHOD FOR MTC GROUP KEY MANAGEMENT

(71) Applicant: NEC Corporation, Tokyo (JP)

(72) Inventors: Xiaowei Zhang, Tokyo (JP); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 230 days.

(21) Appl. No.: 14/908,240

(22) PCT Filed: Jul. 7, 2014

(86) PCT No.: PCT/JP2014/003579
§ 371 (c)(1),
(2) Date: Jan. 28, 2016

(87) PCT Pub. No.: WO2015/015714
PCT Pub. Date: Feb. 5, 2015

(65) Prior Publication Data
US 2016/0182477 A1  Jun. 23, 2016

(30) Foreign Application Priority Data

Jul. 31, 2013 (JP) .............................. JP2013-158881

(51) Int. Cl.
*H04L 9/40* (2022.01)
*H04W 4/70* (2018.01)
(Continued)

(52) U.S. Cl.
CPC .......... *H04L 63/065* (2013.01); *H04L 63/062* (2013.01); *H04W 4/70* (2018.02);
(Continued)

(58) Field of Classification Search
CPC ......... H04L 2463/061; H04L 2463/062; H04L 63/062; H04L 63/065; H04L 63/083;
(Continued)

(56) References Cited

U.S. PATENT DOCUMENTS

| | | | | |
|---|---|---|---|---|
| 4,531,020 A | * | 7/1985 | Wechselberger | .... H04N 7/1675 380/239 |
| 6,049,878 A | * | 4/2000 | Caronni | ................ H04L 9/0836 380/277 |

(Continued)

FOREIGN PATENT DOCUMENTS

| | | |
|---|---|---|
| CN | 101511082 A | 8/2009 |
| CN | 102143491 A | 8/2011 |

(Continued)

OTHER PUBLICATIONS

Cao, Jin, Maode Ma, and Hui Li. "A group-based authentication and key agreement for MTC in LTE networks." Global Communications Conference (GLOBECOM), 2012 IEEE. IEEE, 2012. (Year: 2012).*

(Continued)

*Primary Examiner* — Michael Simitoski

(57) ABSTRACT

In order to improve security upon distributing a group key, there is provided a gateway (20) to a core network for a group of MTC devices (10_1-10_n) communicating with the core network. The gateway (20) protects confidentiality and integrity of a group key, and distributes the protected group key to each of the MTC devices (10_1-10_n). The protection is performed by using: a key (Kgr) that is preliminarily shared between the gateway (20) and each of the MTC devices (10_1-10_n), and that is used for the gateway (20) to authenticate each of the MTC devices (10_1-10_n) as a member of the group; or a key (K_iwf) that is shared between an MTC-IWF (50) and each of the MTC devices (10_1-10_n), and that is used to derive temporary keys for securely conducting individual communication between the MTC-IWF (50) and each of the MTC devices (10_1-10_n).

8 Claims, 9 Drawing Sheets

(51) Int. Cl.
*H04W 4/08* (2009.01)
*H04W 12/06* (2021.01)
*H04W 12/50* (2021.01)
*H04W 88/16* (2009.01)

(52) U.S. Cl.
CPC ........... *H04W 12/50* (2021.01); *H04L 63/083* (2013.01); *H04L 2463/061* (2013.01); *H04L 2463/062* (2013.01); *H04W 4/08* (2013.01); *H04W 12/06* (2013.01); *H04W 88/16* (2013.01)

(58) Field of Classification Search
CPC ..... H04W 12/04; H04W 12/06; H04W 4/005; H04W 4/08; H04W 88/16
See application file for complete search history.

(56) References Cited

U.S. PATENT DOCUMENTS

| | | | |
|---|---|---|---|
| 6,584,566 B1* | 6/2003 | Hardjono | H04L 9/0833 380/277 |
| 9,882,714 B1* | 1/2018 | Cignetti | H04L 63/065 |
| 10,021,533 B2* | 7/2018 | Chandramouli | H04W 4/70 |
| 2002/0055989 A1* | 5/2002 | Stringer-Calvert | H04L 12/4679 709/220 |
| 2003/0044020 A1* | 3/2003 | Aboba | H04L 63/04 380/278 |
| 2004/0215735 A1* | 10/2004 | Nakahara | G06F 21/10 709/207 |
| 2006/0090067 A1* | 4/2006 | Edmonds | H04L 63/083 713/159 |
| 2007/0016663 A1* | 1/2007 | Weis | G06F 11/2028 709/223 |
| 2007/0037555 A1* | 2/2007 | Lee | H04L 63/0853 455/411 |
| 2008/0253562 A1 | 10/2008 | Nyberg | |
| 2009/0245517 A1* | 10/2009 | Tinnakornsrisuphap | H04L 12/189 380/270 |
| 2009/0290522 A1* | 11/2009 | Zhou | H04W 4/08 370/312 |
| 2010/0318605 A1* | 12/2010 | Weis | G06F 11/2028 709/203 |
| 2011/0072488 A1* | 3/2011 | Bi | H04W 12/60 726/1 |
| 2011/0142239 A1* | 6/2011 | Suh | H04W 12/041 380/270 |
| 2011/0249817 A1* | 10/2011 | Park | H04L 9/0822 380/281 |
| 2011/0307694 A1* | 12/2011 | Broustis | H04L 63/065 713/163 |
| 2012/0004003 A1* | 1/2012 | Shaheen | H04W 4/08 455/509 |
| 2012/0033613 A1* | 2/2012 | Lin | H04W 74/085 370/328 |
| 2012/0039213 A1* | 2/2012 | Cheng | H04W 76/12 370/254 |
| 2012/0252481 A1* | 10/2012 | Anpat | H04W 8/06 455/456.1 |
| 2012/0257571 A1* | 10/2012 | Liao | H04W 4/70 370/328 |
| 2012/0257756 A1* | 10/2012 | Huang | H04L 9/0836 380/281 |
| 2012/0263303 A1* | 10/2012 | Tang | H04L 9/0833 380/279 |
| 2012/0296968 A1* | 11/2012 | Lin | H04W 8/26 709/204 |
| 2012/0297193 A1* | 11/2012 | Liu | H04W 12/069 713/169 |
| 2013/0003972 A1* | 1/2013 | Kang | H04L 9/0833 380/270 |
| 2013/0035067 A1* | 2/2013 | Zhang | H04L 63/08 455/411 |
| 2013/0042011 A1* | 2/2013 | Sugizaki | H04Q 3/0045 709/227 |
| 2013/0051228 A1* | 2/2013 | Kim | H04L 47/115 370/230 |
| 2013/0053087 A1* | 2/2013 | Li | H04W 76/002 455/518 |
| 2013/0080782 A1* | 3/2013 | Rajadurai | H04L 63/065 713/171 |
| 2013/0086668 A1 | 4/2013 | Prasad et al. | |
| 2013/0189955 A1* | 7/2013 | Horn | H04W 4/08 455/411 |
| 2013/0290696 A1* | 10/2013 | Broustis | H04L 9/08 713/150 |
| 2013/0291071 A1* | 10/2013 | Blom | H04L 9/0833 726/4 |
| 2014/0185522 A1* | 7/2014 | Xu | H04W 4/005 370/328 |
| 2014/0233736 A1 | 8/2014 | Zhang et al. | |
| 2014/0237559 A1* | 8/2014 | Zhang | H04L 63/062 726/4 |
| 2014/0281508 A1* | 9/2014 | Akhter | H04L 9/0833 713/162 |
| 2015/0012744 A1* | 1/2015 | Chen | H04W 12/04 713/155 |
| 2015/0149767 A1* | 5/2015 | Oualha | H04L 9/3271 713/155 |
| 2015/0200942 A1* | 7/2015 | Zhang | H04W 4/08 726/4 |
| 2015/0249542 A1* | 9/2015 | Xu | H04W 4/70 370/312 |
| 2016/0007138 A1* | 1/2016 | Palanisamy | H04W 4/70 455/41.2 |
| 2016/0119762 A1* | 4/2016 | Zhu | H04W 76/28 370/312 |
| 2016/0301673 A1* | 10/2016 | Yu | G06F 21/606 |
| 2017/0078828 A1* | 3/2017 | Watfa | H04W 76/14 |

FOREIGN PATENT DOCUMENTS

| | | |
|---|---|---|
| CN | 102457844 | 5/2012 |
| CN | 102594555 A | 7/2012 |
| CN | 104349311 A | 2/2015 |
| CN | 104661171 A | 5/2015 |
| EP | 2 765 793 A1 | 8/2014 |
| JP | H09-212089 A | 8/1997 |
| JP | 2004-023237 A | 1/2004 |
| JP | 2008-521278 A | 6/2008 |
| JP | 2010-124238 A | 6/2010 |
| JP | 2012-205088 A | 10/2012 |
| JP | 2013-090199 A | 5/2013 |
| JP | 2014-515207 A | 6/2014 |
| WO | WO 2012/018130 A1 | 2/2012 |
| WO | WO 2012/023337 | 2/2012 |
| WO | 2013/008990 A1 | 1/2013 |
| WO | WO 2013/064089 A1 | 5/2013 |

OTHER PUBLICATIONS

Mittra, Suvo. "Iolus: A framework for scalable secure multicasting." ACM SIGCOMM Computer Communication Review. vol. 27. No. 4. ACM, 1997. (Year: 1997).*

Doh, Inshil, et al. "Key establishment and management for secure cellular machine-to-machine communication." 2013 Seventh International Conference on Innovative Mobile and Internet Services in Ubiquitous Computing. IEEE, 2013. (Year: 2013).*

3GPP TR 23.887 V0.5.0, 3$^{rd}$ Generation Partnership Project; Technical Specification Group Services and System Aspects; "Machine-Type and other Mobile Data Applications Communications Enhancements", (Release 12), pp. 1-95, Nov. 2012.

3GPP TR 33.868 V0.13.0, 3$^{rd}$ Generation Partnership Project; Technical Specification Group Services and System Aspects; "Security aspects of Machine-Type and other Mobile Data Applications Communications Enhancements", (Release 12), pp. 1-91, Apr. 2013.

(56) References Cited

OTHER PUBLICATIONS

3GPP TS 23.682 V11.2.0, $3^{rd}$ Generation Partnership Project; Technical Specification Group Services and System Aspects; "Architecture enhancements to facilitate communications with packet data networks and applications", (Release 11), pp. 1-29, Sep. 2012.
International Search Report and Written Opinion dated Oct. 9, 2014 in corresponding PCT International Application.
Notification of First Office Action dated Jul. 31, 2018, from The State Intellectual Property Office of P.R. China in corresponding Chinese Patent Application No. 201480043251.6.
Notification of Reasons for Refusal issued by the Japanese Patent Office in counterpart Japanese Patent Application No. 2016-503868 dated Jul. 24, 2018.
3GPP TSG SA WG3 (Security) Meeting #69, "pCR Secure Trigger Delivery with Security Association Between MTC-IWF and UE", S3-121117, 7 pages, (2012).
Decision to Grant a Patent issued by the Japanese Patent Office in counterpart Japanese Patent Application No. 2018-177793 dated Oct. 8, 2019.
Office Action dated Jun. 30, 2020, issued by the Japanese Patent Office in counterpart Japanese Patent Application No. 2019-191999.
Indian Office Action for IN Application No. 202018020620 dated Apr. 12, 2022.
Japnese Office Action of JP Application No. 2021-122917 dated Sep. 6, 2022 with English Translation.

* cited by examiner

[Fig. 8]
10
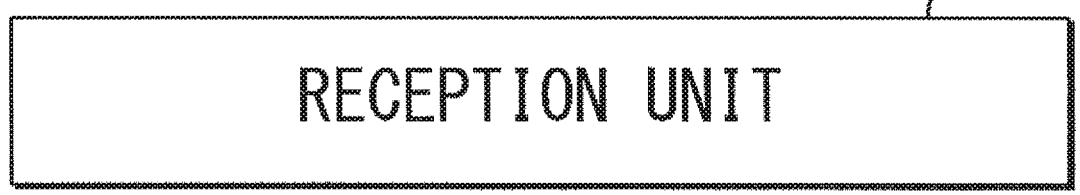
[Fig. 9]
20
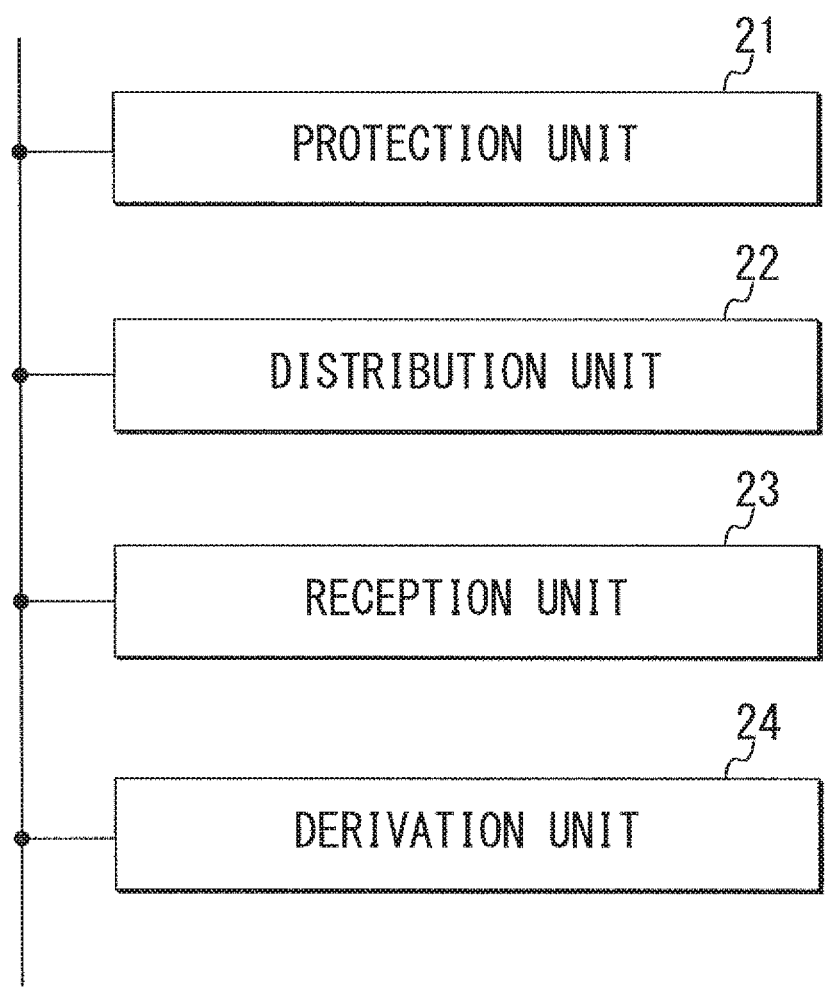

[Fig. 10]
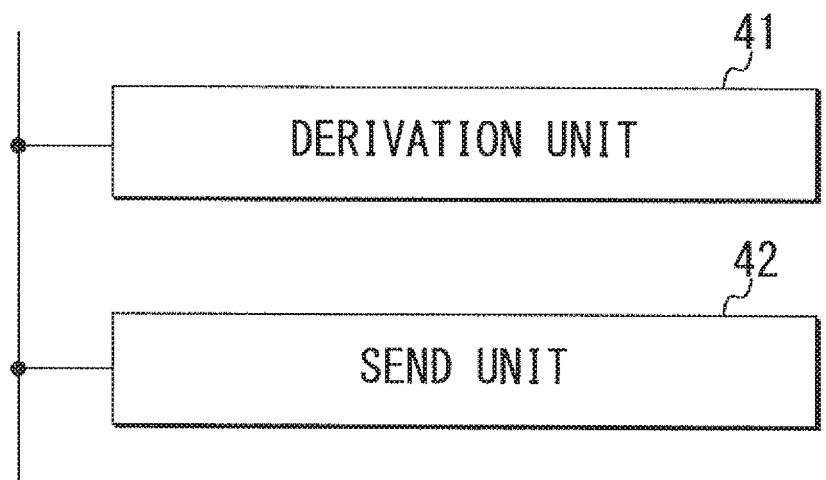
[Fig. 11]
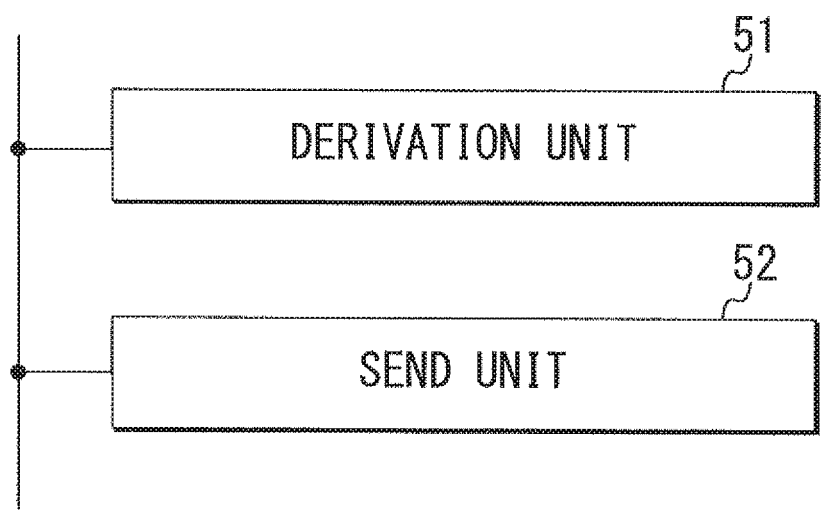

DEVICES AND METHOD FOR MTC GROUP KEY MANAGEMENT

CROSS-REFERENCE TO RELATED PATENT APPLICATIONS

This application is a National Stage Entry of International Application No. PCT/JP2014/003579, filed Jul. 7, 2014, which claims priority from Japanese Patent Application No. 2013-158881, filed Jul. 31, 2013. The entire contents of the above-referenced applications are expressly incorporated herein by reference.

TECHNICAL FIELD

The present invention relates to a security solution for group based MTC (Machine-Type-Communication). In particular, the present invention relates to techniques to distribute a group key within a core network and to MTC devices, to derive the group key and/or to manage the group key.

BACKGROUND ART

The 3GPP (3rd Generation Partnership Project) architecture of MTC has been studied in NPL 1. Study of group based MTC has also been initiated in NPL 2.

Further, PTL 1 discloses that a GW (Gateway) which serves as a gateway to a core network for a group of MTC devices, and uses a group key to securely conduct communication with the group members.

Note that the MTC device is a UE (User Equipment) equipped for MTC, which will be sometimes referred to as "MTC UE" or "UE" in the following explanation.

CITATION LIST

Non Patent Literature

NPL 1: 3GPP TS 23.682, "Architecture enhancements to facilitate communications with packet data networks and applications (Release 11)", V11.2.0, 2012-09

NPL 2: 3GPP TR 23.887, "Machine-Type and other Mobile Data Applications Communications Enhancements (Release 12)", V0.5.0, 2012-11, Clause 8, pp. 78-94

NPL 3: 3GPP TR 33.868, "Security aspects of Machine-Type and other Mobile Data Applications Communications Enhancements; (Release 12)", V0.13.0, 2013-04, Clause A.6.4.2, pp. 87-88

Patent Literature

PTL 1: International Patent Publication No. WO 2012/018130

SUMMARY OF INVENTION

Technical Problem

However, the inventors of this application have found that there is a problem in PTL 1 that the group key is distributed to the group members without any protection.

Note that NPL 3 discloses that an MME (Mobility Management Entity) protects the group key by using NAS (Non Access Stratum) security context. However, there is a problem in NPL 3 that the NAS security context merely ensures the confidentiality of group key.

Accordingly, an exemplary object of the present invention is to improve security upon distributing a group key.

Solution to Problem

In order to achieve the above-mentioned object, a communication system according to first exemplary aspect of the present invention includes a group of MTC devices that communicate with a core network, and a gateway to the core network for the group. The gateway distributes, to each of the MTC devices, a first key for securely conducting group communication. Upon distributing the first key, the gateway protects confidentiality and integrity of the first key by using: a second key that is preliminarily shared between the gateway and each of the MTC devices, and that is used for the gateway to authenticate each of the MTC devices as a member of the group; or a third key that is shared between an MTC-IWF (MTC Inter-Working Function) and each of the MTC devices, and that is used to derive temporary keys for securely conducting individual communication between the MTC-IWF and each of the MTC devices. The MTC-IWF serves as an entering point to the core network for an SCS (Service Capability Server) that communicates with the group through the core network.

Further, a gateway according to second exemplary aspect of the present invention serves as a gateway to a core network for a group of MTC devices communicating with the core network. The gateway includes: protection means for protecting confidentiality and integrity of a first key for securely conducting group communication; and distribution means for distributing the protected first key to each of the MTC devices. The protection means is configured to perform the protection by using: a second key that is preliminarily shared between the gateway and each of the MTC devices, and that is used for the gateway to authenticate each of the MTC devices as a member of the group; or a third key that is shared between an MTC-IWF and each of the MTC devices, and that is used to derive temporary keys for securely conducting individual communication between the MTC-IWF and each of the MTC devices. The MTC-IWF serves as an entering point to the core network for an SCS that communicates with the group through the core network.

Further, an MTC device according to third exemplary aspect of the present invention is grouped to communicate with a core network. The MTC device includes: reception means for receiving, from a gateway to the core network for a group of MTC devices, a first key for securely conducting group communication. Confidentiality and integrity of the first key are protected with a second key or a third key. The second key is preliminarily shared between the gateway and each of the MTC devices, and used for the gateway to authenticate each of the MTC devices as a member of the group. The third key is shared between an MTC-IWF and each of the MTC devices, and used to derive temporary keys for securely conducting individual communication between the MTC-IWF and each of the MTC devices. The MTC-IWF serves as an entering point to the core network for an SCS that communicates with the group through the core network.

Further, a method according to fourth exemplary aspect of the present invention provides a method of controlling operations in a gateway to a core network for a group of MTC devices that communicates with the core network. This method includes: protecting confidentiality and integrity of a first key for securely conducting group communication; and distributing the protected first key to each of the MTC devices. The protection is performed by using: a second key that is preliminarily shared between the gateway and each of the MTC devices, and that is used for the gateway to authenticate each of the MTC devices as a member of the group; or a third key that is shared between an MTC-IWF and each of the MTC devices, and that is used to derive temporary keys for securely conducting individual communication between the MTC-IWF and each of the MTC devices. The MTC-IWF serves as an entering point to the core network for an SCS that communicates with the group through the core network.

Furthermore, a method according to fifth exemplary aspect of the present invention provides a method of controlling operations in an MTC device that is grouped to communicate with a core network. This method includes: receiving, from a gateway to the core network for a group of MTC devices, a first key for securely conducting group communication. Confidentiality and integrity of the first key are protected with a second key or a third key. The second key is preliminarily shared between the gateway and each of the MTC devices, and used for the gateway to authenticate each of the MTC devices as a member of the group. The third key is shared between an MTC-IWF and each of the MTC devices, and used to derive temporary keys for securely conducting individual communication between the MTC-IWF and each of the MTC devices. The MTC-IWF serves as an entering point to the core network for an SCS that communicates with the group through the core network.

Advantageous Effects of Invention

According to the present invention, it is possible to solve the above-mentioned problems, and thus to improve security upon distributing a group key.

BRIEF DESCRIPTION OF DRAWINGS

FIG. 8 is a block diagram showing a configuration example of a MTC UE according to the exemplary embodiment.

FIG. 9 is a block diagram showing a configuration example of a group GW according to the exemplary embodiment.

FIG. 10 is a block diagram showing a configuration example of an HSS according to the exemplary embodiment.

FIG. 11 is a block diagram showing a configuration example of an MTC-IWF according to the exemplary embodiment.

DESCRIPTION OF EMBODIMENTS

Hereinafter, an exemplary embodiment of the present invention will be described with the accompany drawings.

In this exemplary embodiment, there will be proposed details for group keys derivation at a core network, key distribution to proper network nodes and UEs, key management and how the group keys are used for securing communication. Key derivation parameters can be either sent from an HSS (Home Subscriber Server) to an MTC-IWF, or from the MTC-IWF to the HSS. The derivation algorithms are available in the network node.

Figure 1:
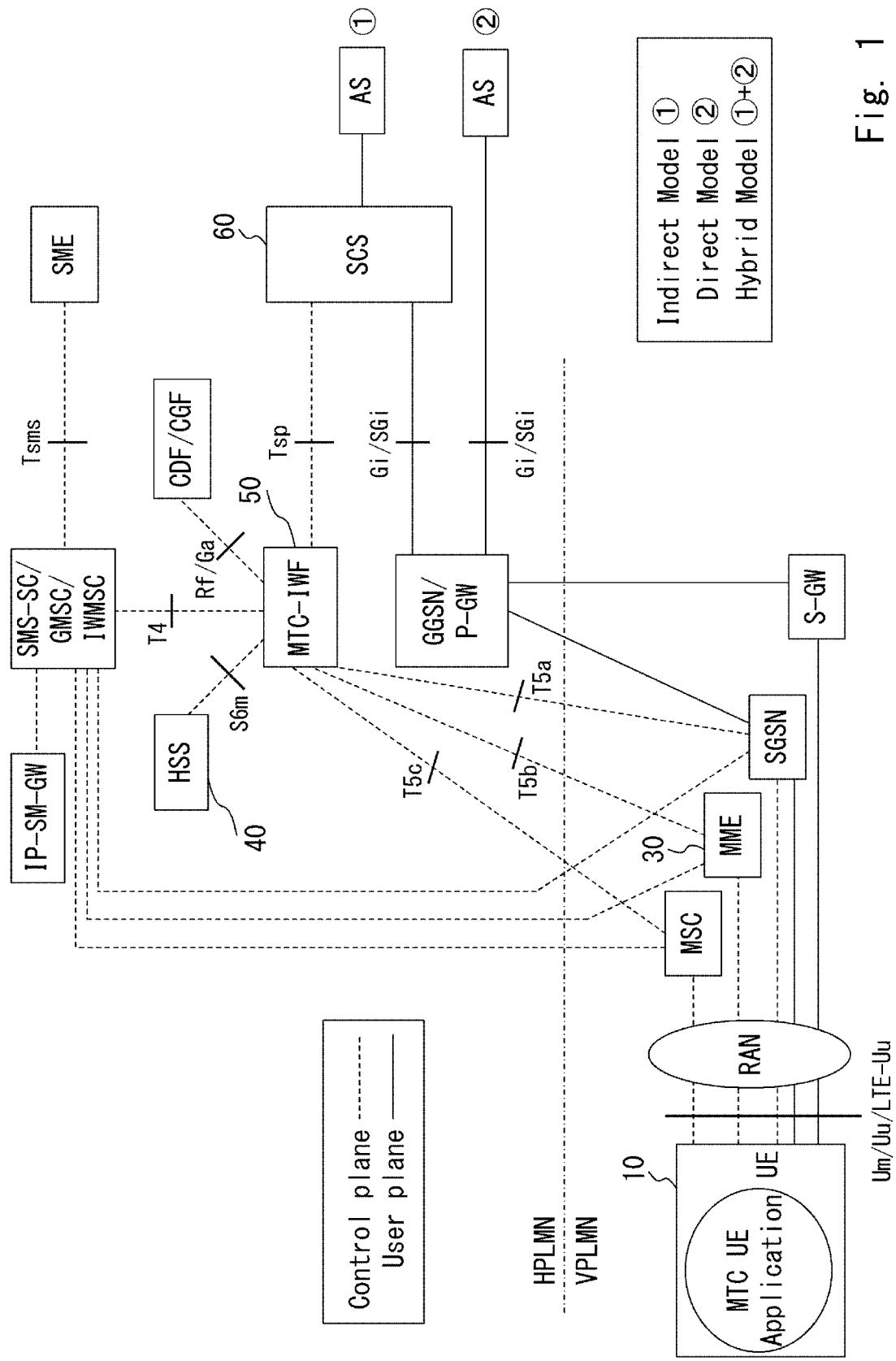
FIG. 1 is a block diagram showing a configuration example of a communication system according to an exemplary embodiment of the present invention.

As shown in FIG. 1, a communication system according to this exemplary embodiment includes a core network (3GPP network), and one or more MTC UEs 10 which are UEs equipped for MTC and connect to the core network through a RAN (Radio Access Network). In this exemplary embodiment, the MTC UEs 10 are grouped to communicate with the core network. Note that while the illustration is omitted, the RAN is formed by a plurality of base stations (e.g., eNBs (evolved Node Bs)).

The MTC UE 10 attaches to the core network. The MTC UE 10 can host one or multiple MTC Applications. The corresponding MTC Applications in the external network are hosted on an SCS 60. The SCS 60 connects to the core network to communicate with the MTC UE 10.

Further, the core network includes an MME 30, an HSS 40 and an MTC-IWF 50 as a part of its network nodes. The MME 30 relays traffic between the RAN and the MTC-IWF 50. The HSS 40 manages subscription information on the MTC UEs 10, and the like. The MTC-IWF 50 serves as an entering point to the core network for the SCS 60, and if necessary, acquires the subscription information and the like from the HSS 40. The core network also includes, as other network nodes, an SGSN (Serving GPRS (General Packet Radio Service) Support Node), an MSC (Mobile Switching Centre) and the like. The SGSN and the MSC function as with the MME 30.

While the illustration is omitted in FIG. 1, the core network includes a gateway to the core network for the group of MTC UEs 10. Hereinafter, this gateway is referred to as "group GW" and denoted by the symbol 20. Typically, the group GW 20 distributes to each of the MTC UEs 10 a group key for securely conducting group communication between the group GW 20 and the group of MTC UEs 10. The group GW 20 can be either deployed in a network node or be an independent node.

Next, operation examples of this exemplary embodiment will be described in detail with reference to FIGS. 2 to 7. Note that configuration examples of the MTC UE 10, the group GW 20, the HSS 40 and the MTC-IWF 50 will be described later with reference to FIGS. 8 to 11.

1. Key Distribution

Group communication requires the group GW 20 and group member of MTC UEs 10 share the same group key.

There are two options that the group GW 20 can obtain the group keys. One of options is a case where the group GW 20 itself derives the group key. There will be described later how to derive the group key. Another one of options is a case where the group GW 20 receives the group key from another network node. This exemplary embodiment further considers that whether the group GW 20 is configured at the MTC-IWF 50 or not.

Figure 2:
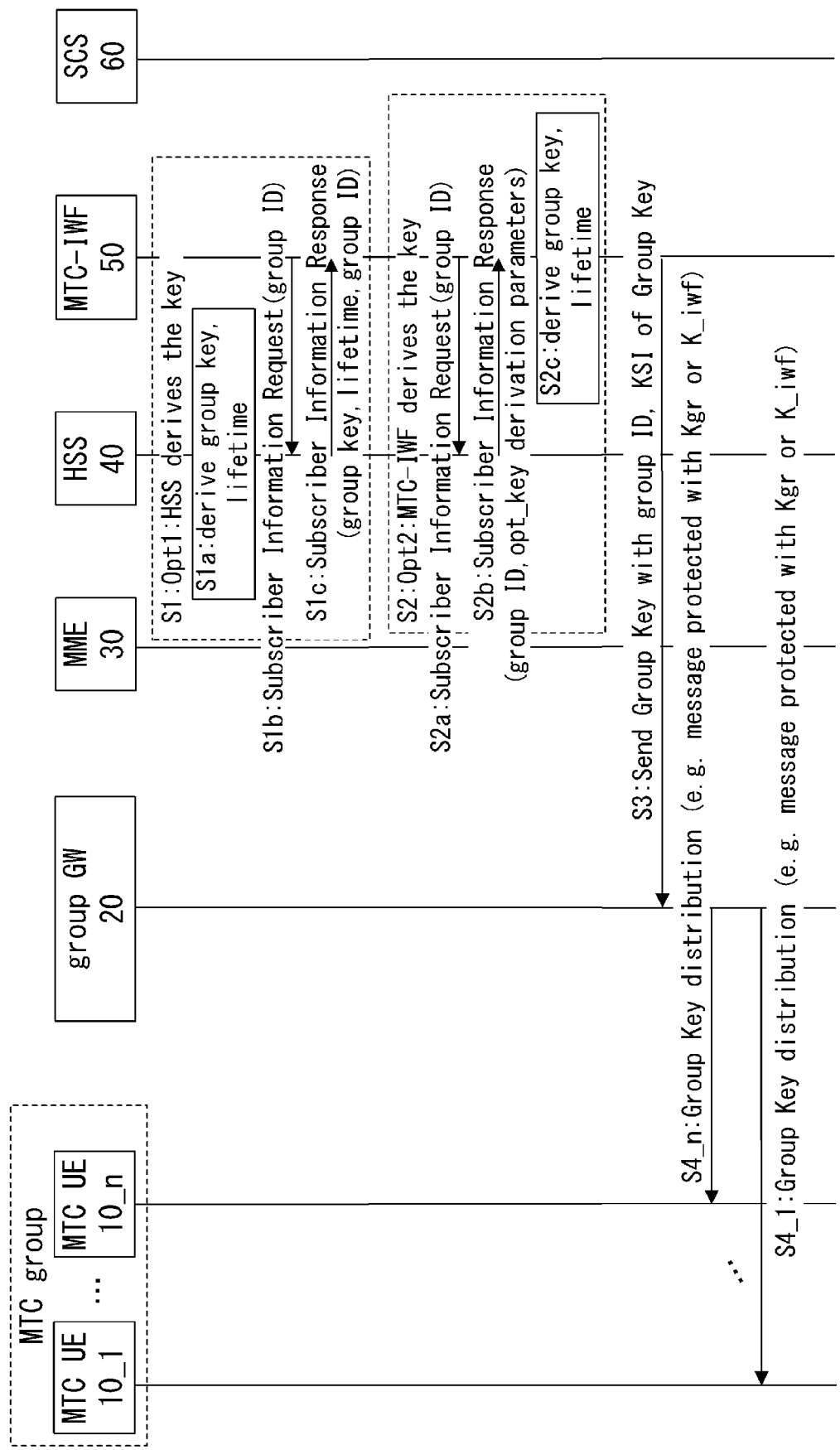
FIG. 2 is a sequence diagram showing a first operation example of the communication system according to the exemplary embodiment.

(1) Case Where the MTC-IWF 50 is Not Group GW 20 but shares the Group Key In this case, as shown in FIG. 2, the HSS 40 derives the group key and sends it to the MTC-IWF 50 together with group ID in a Subscriber Information Response message (Steps S1*a* to S1*c*).

Alternatively, the MTC-IWF 50 derives the group key, when it has received the group ID and optionally key derivation parameters from the HSS 40 in the Subscriber Information Response message (Steps S2*a* to S2*c*).

The derived group key is sent, to the group GW 20 through the MME 30, together with the group ID and a KSI (Key Set Identifier) of the group key (Step S3).

Then, the group GW 20 distributes the group key to MTC UEs 10_1 to 10_*n* (n≥2) which are members of MTC group (Steps S4_1 to S4_*n*).

There are two ways to protect the group key upon the distribution to the MTC UEs 10_1 to 10_*n*.

One of ways is to use a pre-configured authentication used group key Kgr. The key Kgr is preliminarily shared between the group GW 20 and each of the MTC UEs 10_1 to 10_*n*, and used for the group GW 20 to authenticate each of the MTC UEs 10_1 to 10_*n* as a member of the MTC group.

Upon the authentication, each of the MTC UEs 10_1 to 10_*n* receives an Authentication Request message from the group GW 20, and then computes e.g., a RES (authentication response) with the key Kgr. Each of the MTC UEs 10_1 to 10_*n* sends to the group GW 20 an Authentication Response message containing the computed RES. The group GW 20 checks the received RES with the key Kgr, thereby authenticating each of the MTC UEs 10_1 to 10_*n*.

Upon the distribution, the group GW 20 encrypts the group key with the key Kgr to protect the confidentiality of group key, and also ensures the integrity of group key with the key Kgr. Each of the MTC UEs 10_1 to 10_*n* decrypts the received group key with the key Kgr, and also checks the integrity of the received group key with the key Kgr.

Another one of ways is to use a root key K_iwf. The root key K_iwf is shared between the MTC-IWF 50 and each of the MTC UEs 10_1 to 10_*n*, and used to derive temporary keys for securely conducting individual communication between the MTC-IWF 50 and each of the MTC UEs 10_1 to 10_*n*.

One of temporary keys is a confidentiality key for encrypting and decrypting messages transferred between the MTC-IWF and the MTC UE. Another one of temporary keys is an integrity key for checking the integrity of message transferred between the MTC-IWF and the MTC UE.

Upon the distribution, the group GW 20 encrypts the group key with the key K_iwf to protect the confidentiality of group key, and also ensures the integrity of group key with the key K_iwf. Each of the MTC UEs 10_1 to 10_*n* decrypts the received group key with the key K_iwf, and also checks the integrity of the received group key with the key K_iwf.

According to this exemplary embodiment, both of the confidentiality and integrity of group key is ensured upon the distribution to the group member, so that it is possible to greatly improve security compared with the above-mentioned PTL 1 and NPL 3.

(2) Case Where the MTC-IWF 50 is the Group GW 20

Figure 3:
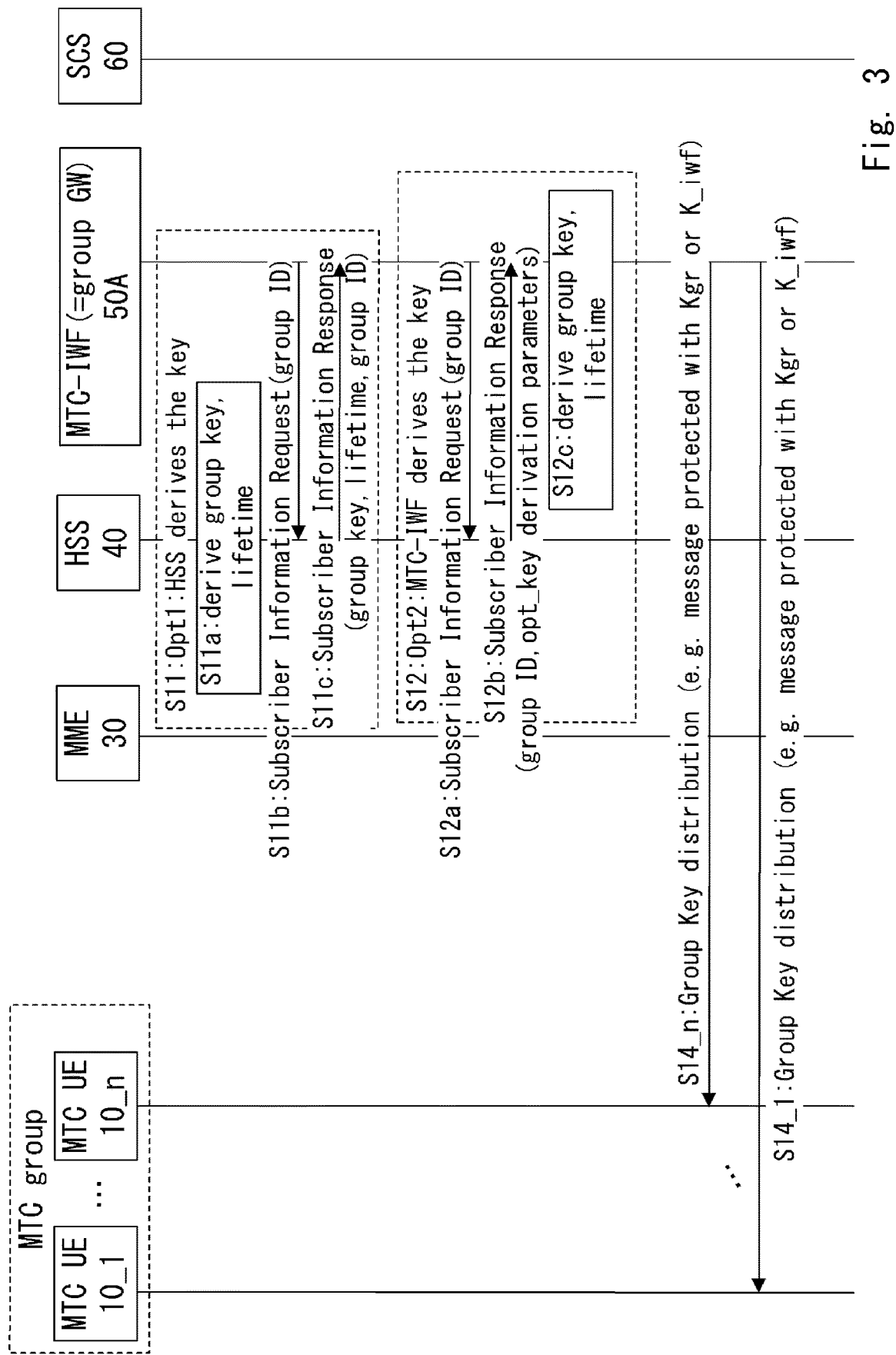
FIG. 3 is a sequence diagram showing a second operation example of the communication system according to the exemplary embodiment.

In this case, as shown in FIG. 3, the HSS 40 or an MTC-IWF 50A (which also serves as the group GW) derives the group key in a similar manner to FIG. 2 (Steps S11*a* to S12*c*).

Then, the MTC-IWF 50A distributes the group key to the MTC UEs 10_1 to 10_*n* in a similar manner to FIG. 2 (Steps S14_1 to S14_*n*).

Figure 4:
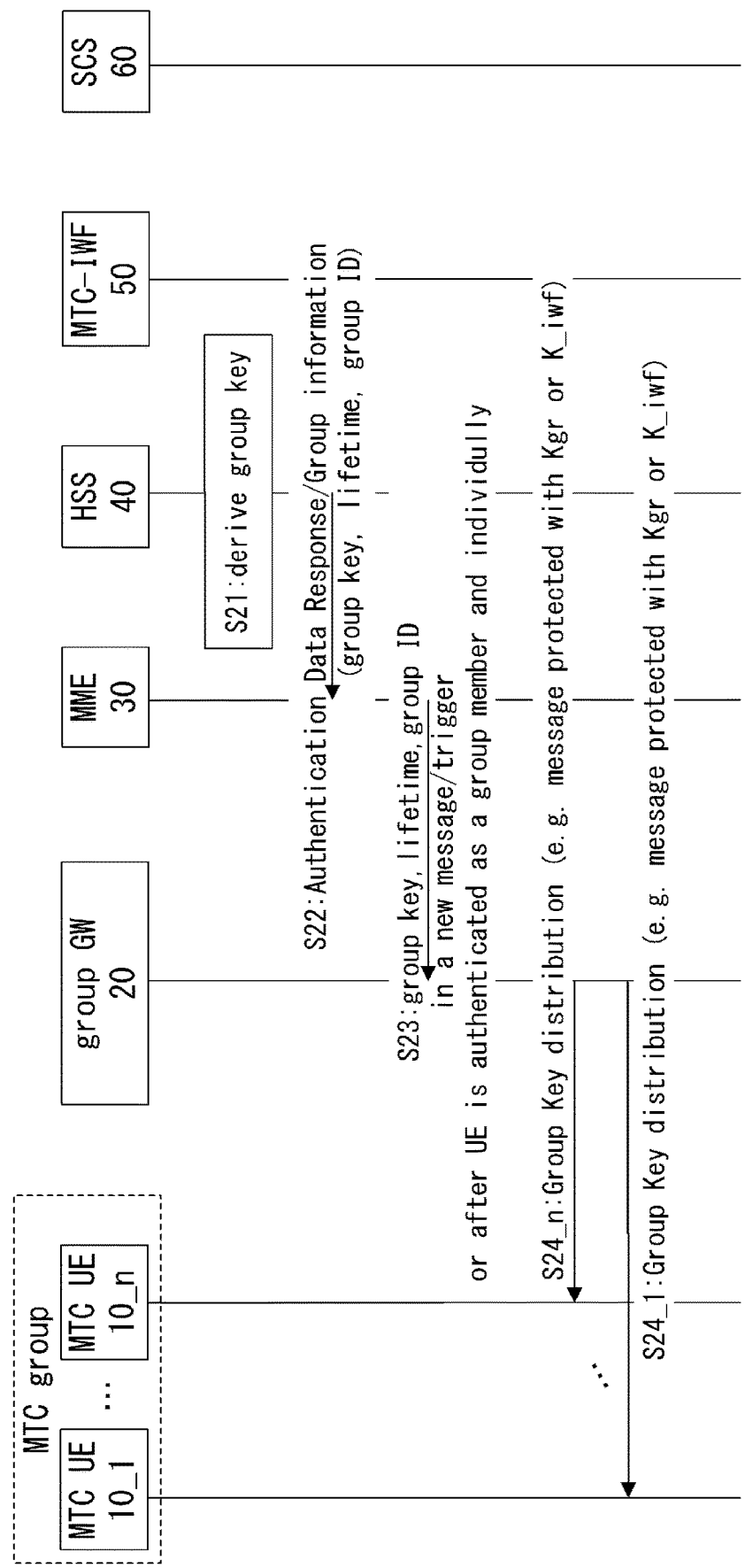
FIG. 4 is a sequence diagram showing a third operation example of the communication system according to the exemplary embodiment.

(3) Case Where the MTC-IWF 50 is Not Group GW 20 and Does Not Need to Share the Group Key In this case, as shown in FIG. 4, the HSS 40 derives the group key and sends it to the MME 30 during UE authentication procedure in e.g., an Authentication Data Response message (Steps S21 and S22). In the case of including the group key in the Authentication Data Response message, it is possible to reduce the impact to communication protocols. This is because the Authentication Data Response message is the existing message transferred between typical MME and HSS.

The MME 30 can send the group key to the group GW 20 in a new message or include it in the forwarded trigger (Step S23).

The group key can be only activated after each of the MTC UEs 10_1 to 10_*n* is authenticated to the core network as the group member and individually. Thereafter, the MME 30 can also send the group key to the group GW 20 after it confirmed that each of the MTC UEs 10_1 to 10_*n* is authenticated as the group member and individually.

Then, the group GW 20 distributes the group key to the MTC UEs 10_1 to 10_*n* in a similar manner to FIG. 2 (Steps S24_1 to S24_*n*).

2. Key Derivation

For deriving the group key, the KDF (Key Derivation Function) defined in 3GPP TS 33.401 can be re-used.

There are four options of input parameter:

(1) the pre-configured key Kgr (in MTC UE and group GW);

(2) the key K_iwf that shared between MTC-IWF and MTC UE;

(3) Kasme defined in 3GPP TS 33.401; and (4) random number.

Other parameters can be: internal group ID, group gateway ID, key derivation algorithm identifier, counter.

A lifetime value can be also generated when the new group keys are derived.

Key derivation parameters can be sent from the HSS 40 to the MTC-IWF 50 (or 50A), or from the MTC-IWF 50 (or 50A) to the HSS 40. The derivation algorithms are configured in the network node which derives the group key.

3. Key Management

The Group Key can be Updated when:

the lifetime of the group key is expired;

a group member is deleted from the group;

the derivation parameter (e.g., the root key K_iwf) has been updated; or derive and store new group keys before transit to inactive state.

Figure 5:
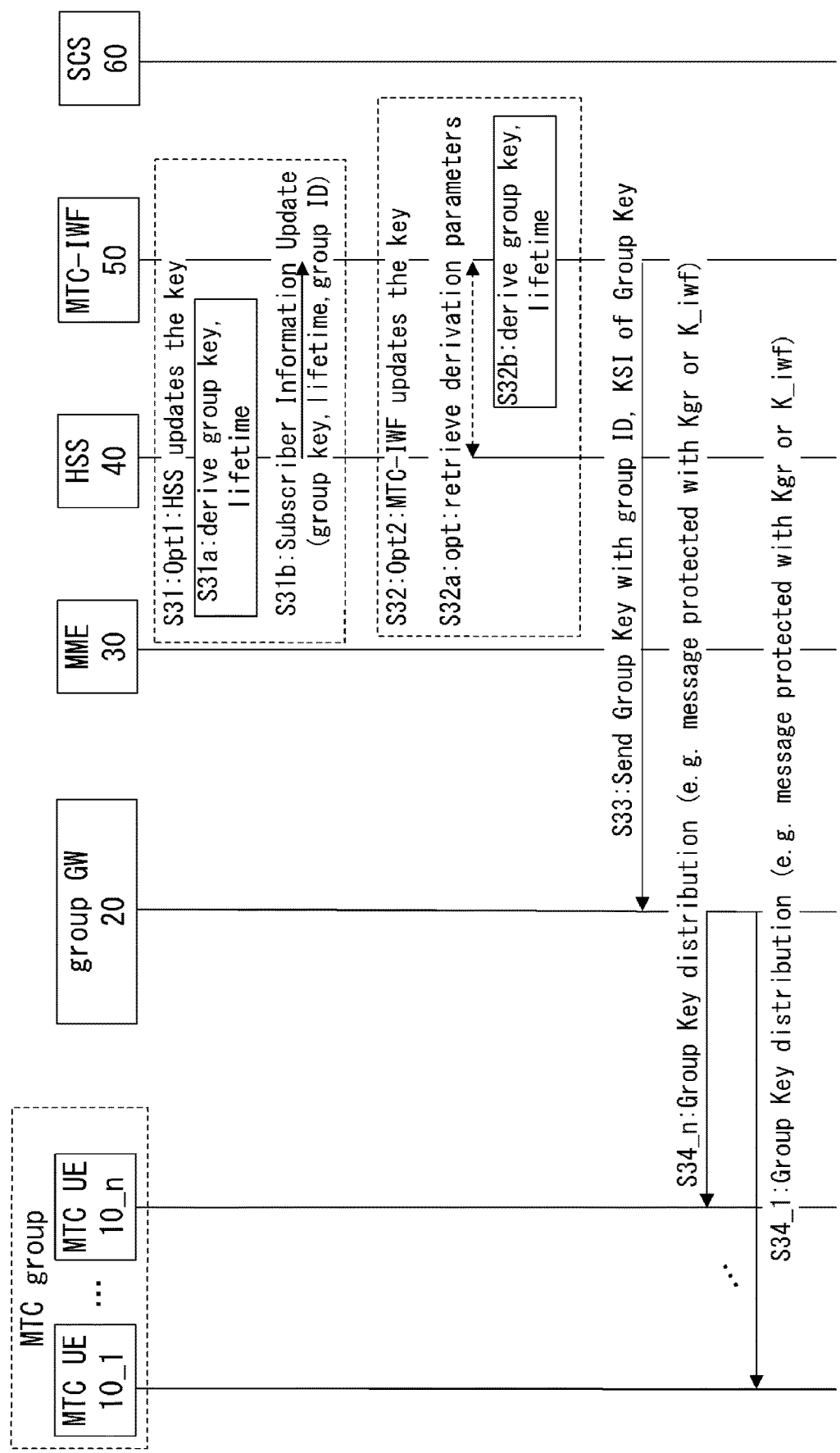
FIG. 5 is a sequence diagram showing a fourth operation example of the communication system according to the exemplary embodiment.
Figure 6:
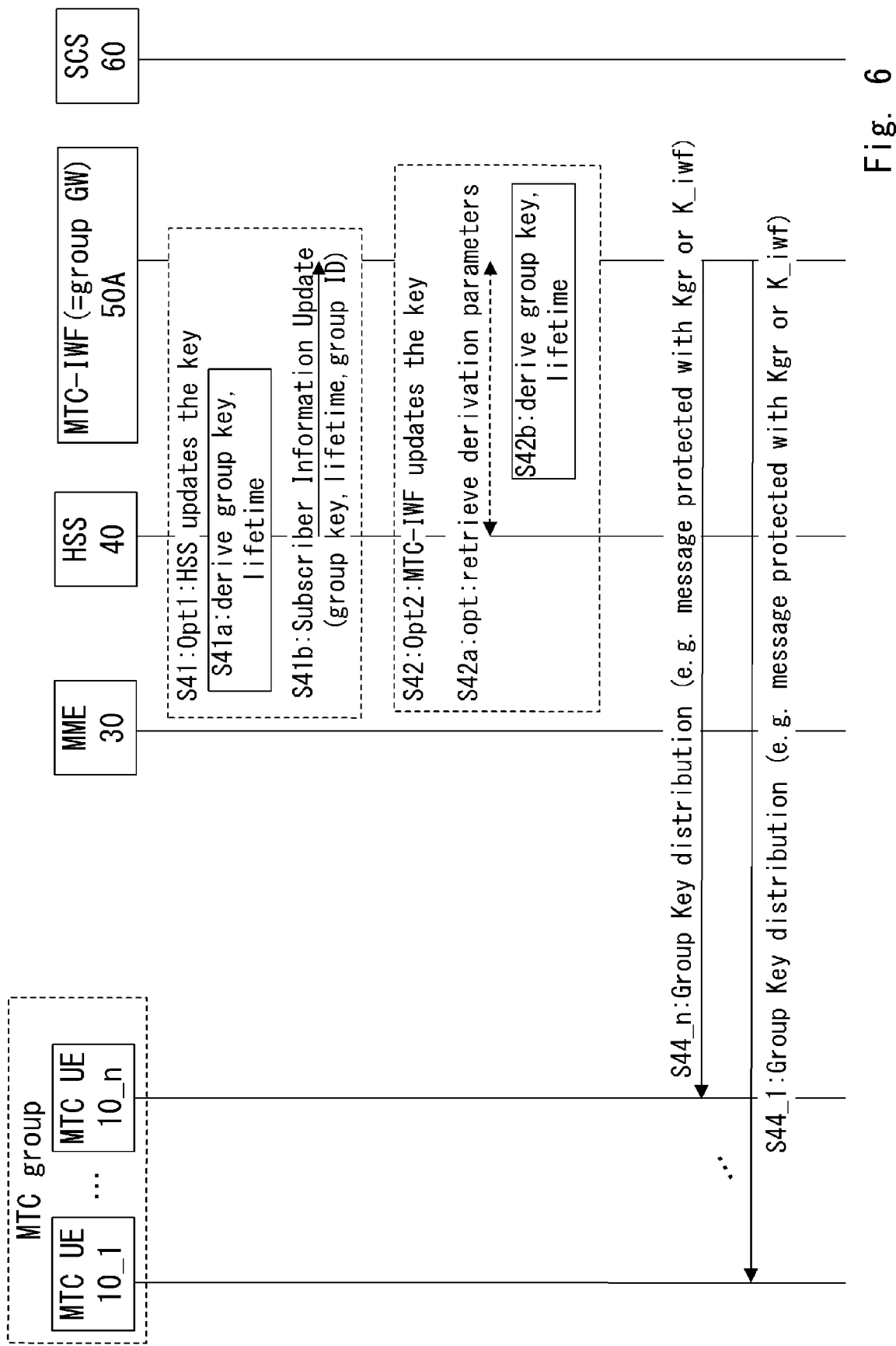
FIG. 6 is a sequence diagram showing a fifth operation example of the communication system according to the exemplary embodiment.
Figure 7:
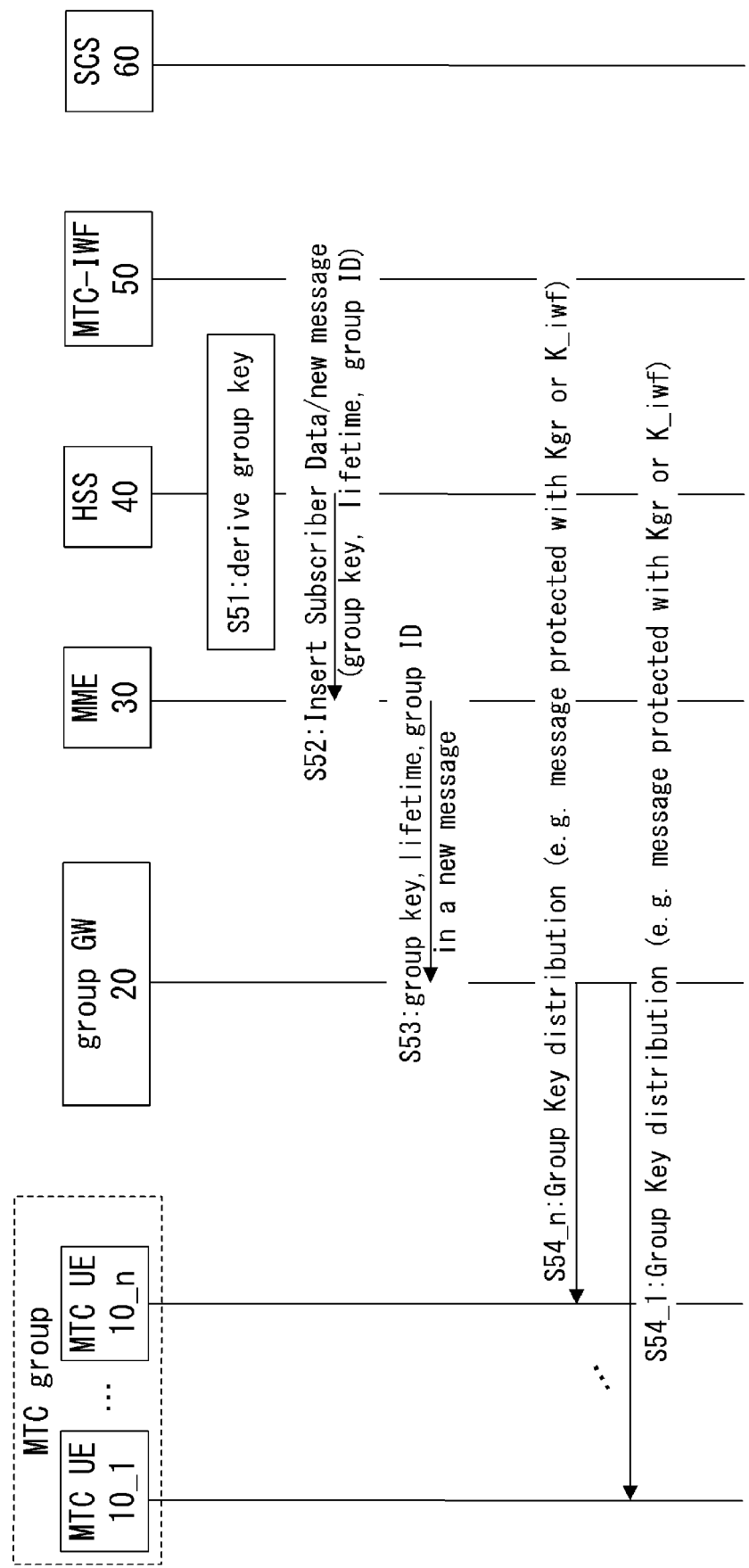
FIG. 7 is a sequence diagram showing a sixth operation example of the communication system according to the exemplary embodiment.

Examples of key update procedure are shown in FIGS. 5 to 7.

(1) Case Where the MTC-IWF 50 is Not Group GW 20 but Shares the Group Key In this case, as shown in FIG. 5, the HSS 40 updates the group key and sends it to the MTC-IWF 50 together with group ID in a Subscriber Information Update message (Steps S31*a* and S31*b*).

Alternatively, the MTC-IWF 50 updates the group key, and optionally retrieves key derivation parameters from the HSS 40 (Steps S32*a* and S32*b*).

The updated group key is sent, to the group GW 20 through the MME 30, together with the group ID and a KSI of the updated group key (Step S33).

Then, the group GW 20 re-distributes the updated group key to MTC UEs 10_1 to 10_n (Steps S34_1 to S34_n). At this time, the updated group key is protected by using the key Kgr or K_iwf.

(2) Case Where the MTC-IWF 50 is the Group GW 20

In this case, as shown in FIG. 6, the HSS 40 or the MTC-IWF 50A updates the group key in a similar manner to FIG. 5 (Steps S41a to S42b).

Then, the MTC-IWF 50A re-distributes the updated group key to the MTC UEs 10_1 to 10_n in a similar manner to FIG. 5 (Steps S44_1 to S44_n).

(3) Case Where the MTC-IWF 50 is Not Group GW 20 and Does Not Need to Share the Group Key In this case, as shown in FIG. 7, the HSS 40 updates the group key and sends it to the MME 30 in e.g., an Insert Subscriber Data message (Steps S51 and S52). In the case of including the updated group key in the Insert Subscriber Data message, it is possible to reduce the impact to communication protocols. This is because the Insert Subscriber Data is the existing message transferred between typical MME and HSS.

The MME 30 can send the updated group key to the group GW 20 in a new message (Step S53).

Then, the group GW 20 re-distributes the updated group key to the MTC UEs 10_1 to 10_n in a similar manner to FIG. 5 (Steps S54_1 to S54_n).

Next, configuration examples of the MTC UE 10, the group GW 20, the HSS 40 and the MTC-IWF 50 (50A) according to this exemplary embodiment will be described with reference to FIGS. 8 to 11.

As shown in FIG. 8, the MTC UE 10 includes a reception unit 11 that receives the protected group key from the group GW 20. The reception unit 11 can be configured by, for example, a transceiver which wirelessly conducts communication with the core network through the RAN, and a controller such as a CPU (Central Processing Unit) which controls this transceiver.

As show in FIG. 9, the group GW 20 includes at least a protection unit 21 and a distribution unit 22. The protection unit 21 protects the group key by using the key Kgr or K_iwf. The distribution unit 22 distributes the protected group key to the MTC UE 10. In the case where the HSS 40 or the MTC-IWF 50 (not the Group GW 20) derives the group key, the group GW 20 further includes a reception unit 23 that receives the group key from the HSS 40 or the MTC-IWF 50. The reception unit 23 also receives the updated group key. As a substitute for the reception unit 23, the group GW 20 may include a derivation unit 24 that derives the group key by using, as the key derivation parameters, the key Kgr, the key K_iwf, the Kasme or the random number. The derivation unit 24 also updates the group key. In either case, the protection unit 21 protects the updated group key by using the key Kgr or K_iwf, and the distribution unit 22 re-distributes the protected and updated group key. Note that these units 21 to 24 are mutually connected with each other through a bus or the like. These units 21 to 24 can be configured by, for example, transceivers which conduct communication with other nodes within the core network, and a controller such as a CPU which controls these transceivers.

As show in FIG. 10, the HSS 40 can include a derivation unit 41 and a send unit 42 in addition to elements of a typical HSS. The derivation unit 41 derives the group key by using, as the key derivation parameters, the key Kgr, the key K_iwf, the Kasme or the random number.

The send unit 42 sends the group key to the group GW 20 and/or the MTC-IWF 50. The derivation unit 41 may update the group key, and the send unit 42 may send the updated group key to the group GW 20 and/or the MTC-IWF 50. Note that these units 41 and 42 are mutually connected with each other through a bus or the like. These units 41 and 42 can be configured by, for example, transceivers which conduct communication with other nodes within the core network, and a controller such as a CPU which controls these transceivers.

As show in FIG. 11, the MTC-IWF 50 (50A) can include a derivation unit 51 and a send unit 52 in addition to elements of a typical MTC-IWF. The derivation unit 51 derives the group key by using, as the key derivation parameters, the key Kgr, the key K_iwf, the Kasme or the random number. The send unit 52 sends the group key to the group GW 20 or the MTC UE 10. The derivation unit 51 may update the group key, and the send unit 52 may send the updated group key to the group GW 20 or the MTC UE 10. Note that these units 51 and 52 are mutually connected with each other through a bus or the like. These units 51 and 52 can be configured by, for example, transceivers which conduct communication with other nodes within the core network, and a controller such as a CPU which controls these transceivers.

Note that the present invention is not limited to the above-mentioned exemplary embodiment, and it is obvious that various modifications can be made by those of ordinary skill in the art based on the recitation of the claims.

This application is based upon and claims the benefit of priority from Japanese patent application No. 2013-158881, filed on Jul. 31, 2013, the disclosure of which is incorporated herein in its entirety by reference.

REFERENCE SIGNS LIST

10, 10_1-10_n MTC UE
11, 23 RECEPTION UNIT
20 Group GW
21 PROTECTION UNIT
22 DISTRIBUTION UNIT
24, 41, 51 DERIVATION UNIT
30 MME
40 HSS
42, 52 SEND UNIT
50, 50A MTC-IWF
60 SCS

The invention claimed is:

1. A group gateway in a group communication system including a User Equipment (UE), an independent node deployed in a node different from a node in which the group gateway is deployed, the independent node being a Mobility Management Entity (MME) or a Serving GPRS Support Node (SGSN), and a network server, the group gateway comprising:
   a processor; and
   a memory having stored thereon a set of instructions executable by the processor, wherein upon execution of the instructions the processor causes the group gateway to:
      receive a group ID and a security related parameter from the network server;
      derive a first key;
      authenticate the UE based on a second key that is shared between the UE and the group gateway;
      distribute, to the UE via the MME or the SGSN, the first key that is protected based on the second key; and
      control a key lifetime for updating the first key.

2. The group gateway according to claim 1, wherein the network server is a Home Subscriber Server (HSS).

3. A method of a group gateway in a group communication system including a User Equipment (UE), an independent node deployed in a node different from a node in which the group gateway is deployed, the independent node being a Mobility Management Entity (MME) or a Serving GPRS Support Node (SGSN), and a network server, the method comprising:
- receiving a group ID and a security related parameter from the network server;
- deriving a first key;
- authenticating the UE based on a second key that is shared between the UE and the group gateway;
- distributing, to the UE via the MME or the SGSN, the first key that is protected based on the second key; and
- controlling a key lifetime for updating the first key.

4. The method according to claim 3, further comprising: re-distributing an updated first key to the UE.

5. A User Equipment (UE) in a group communication system including an independent node deployed in a node different from a node in which the group gateway is deployed, the independent node being a Mobility Management Entity (MME) or a Serving GPRS Support Node (SGSN), a network server and a group gateway, the UE comprising:
- a processor; and
- a memory having stored thereon a set of instructions executable by the processor, wherein upon execution of the instructions the processor causes the UE to:
  - cause the group gateway to authenticate the UE based on a second key that is shared between the UE and the group gateway;
  - receive, from the group gateway via the MME or the SGSN, a first key protected based on the second key, wherein the group gateway receives a group ID and a security related parameter from the network server, derives the first key, and controls a key lifetime for updating the first key; and
  - decrypt the protected first key using the second key.

6. The UE according to claim 5, wherein the network server is a Home Subscriber Server (HSS).

7. A method of a UE (User Equipment) in a group communication system including an independent node deployed in a node different from a node in which the group gateway is deployed, the independent node being a Mobility Management Entity (MME) or a Serving GPRS Support Node (SGSN), a network server and a group gateway, the method comprising:
- causing the group gateway to authenticate the UE based on a second key that is shared between the UE and the group gateway;
- receiving, from the group gateway via the MME or the SGSN, a first key protected based on the second key, wherein the group gateway receives a group ID and a security related parameter form the network server, derives the first key, and controls a key lifetime for updating the first key; and
- decrypting the protected first key using the second key.

8. The method according to claim 7, wherein the group gateway re-distributes an updated first key to the UE.

* * * * *